United States Patent [19]
Miller et al.

[11] Patent Number: 6,085,597
[45] Date of Patent: Jul. 11, 2000

[54] GAUGE PROTECTOR

[75] Inventors: Jeffery Alan Miller, St. Louis; Kevin Donald Kroupa; Gabriel Shlomo Kohn, both of Ballwin; Kin Edward Golemb, St. Louis; Peter Christopher Gonzalez, Ballwin, all of Mo.

[73] Assignee: Allied Healthcare Products, Inc., St. Louis, Mo.

[21] Appl. No.: 09/039,236

[22] Filed: Mar. 16, 1998

[51] Int. Cl.⁷ .............................. G01L 19/14; G01L 19/16
[52] U.S. Cl. ................. 73/756; 73/431; 359/894
[58] Field of Search ....................... 73/756, 431; 359/894

[56] References Cited

U.S. PATENT DOCUMENTS

| | | | |
|---|---|---|---|
| 3,762,224 | 10/1973 | Vander Horst | 73/431 X |
| 3,843,085 | 10/1974 | Castro | 248/311.2 |
| 4,034,612 | 7/1977 | Buckwitz | 73/431 |
| 4,197,747 | 4/1980 | Koehler | 73/431 |
| 4,315,432 | 2/1982 | Newton | 73/431 |
| 4,420,013 | 12/1983 | DiBlasio | 137/382 |
| 4,491,015 | 1/1985 | Allemano | 73/431 X |
| 4,577,511 | 3/1986 | Wetzel | 73/431 X |
| 4,928,530 | 5/1990 | Lehto et al. | 73/431 X |
| 4,970,900 | 11/1990 | Shepherd et al. | 73/431 X |
| 5,197,330 | 3/1993 | Onodera | 73/431 |

FOREIGN PATENT DOCUMENTS

| | | |
|---|---|---|
| 3805815 | 9/1989 | Germany . |
| 4103461 | 8/1992 | Germany . |
| 288627 | 11/1993 | Japan . |

OTHER PUBLICATIONS

JP409166511A abstract of JP 9–166511A dated Jun. 24, 1997 inventor Ichi et al "Explosion Proof Case" by JPO & Derwent Info. Ltd.

JP409159491A abstract of JP 9–159491A dated Jun. 2, 1997 inventor Mizoguchi "Site Type Measuring Instrument" by JPO & Derwent Inf. Ltd.

JP409273971A abstract of JP 9–273971A dated Oct. 21, 1997 inventor Kurota et al "Anti–Radio Wave Trouble Countermeasure Structure of Pressure Sensor" by JPO & Derwent Inf. Ltd, image by GPIC.

*Primary Examiner*—Thomas P. Noland
*Attorney, Agent, or Firm*—Dickstein Shapiro Morin & Oshinsky LLP

[57] ABSTRACT

A device for protecting a gauge includes a base portion for attachment to a surface, and a cover portion attached to the base portion for shielding the gauge from impact. In one embodiment, the base portion has legs defining a saddle-shaped surface matching the surface to which the gauge protector is attached. The cover portion may have a sight glass positioned such that the gauge face is visible even though the entire gauge is enclosed. The device may be used to protect a pressure gauge for a regulator for a portable oxygen bottle.

8 Claims, 5 Drawing Sheets

GAUGE PROTECTOR

BACKGROUND

The present invention relates to a system for protecting a device such as a gauge.

Gauges are often designed with stems that are adapted to be inserted into or through a wall. For example, in the healthcare industry, a pressure gauge may be attached to a regulator for a portable oxygen bottle. Because the gauge protrudes from the surface of the regulator body, the gauge is susceptible to damage from impact or other harm, such as contact with fluids. Impact forces may result in forcible removal of the gauge from the regulator, leaving the regulator body damaged and unable to accept a replacement gauge.

Devices have been developed to protect protruding gauges. The known devices include rubber and foam covers that surround the gauge body and absorb some of the shock from an impact. Such protectors are somewhat successful in absorbing impact forces. However, they still permit damaging impact forces to be transferred to the gauge's threaded stem.

Accordingly, there is a need in the art for a gauge protector that isolates the gauge body and stem from impact forces and other harms.

SUMMARY

The present invention overcomes to a great extent the deficiencies of the prior art by providing a gauge protector that has (1) a base portion attached to the surface from which the gauge protrudes and (2) a cover portion connected to the base portion and sized and positioned to shield at least a portion of the gauge.

An advantage of the invention is that impact forces that might otherwise damage the protected object are transmitted through the gauge base to the wall to which the gauge is attached. In this manner, the gauge is largely isolated from direct impact.

In one aspect of the invention, the cover portion is separate from the base portion such that it is only necessary to remove the cover portion to allow the gauge to be removed, cleaned or serviced.

In another aspect of the invention, the base portion covers only half (or less) of the surface of the tubular regulator body. This arrangement allows for an exposed surface area such that additional devices may be attached to the regulator body.

In another aspect of the invention, the gauge protector is formed of two pieces separated along a plane passing through the center of the gauge stem. With this feature, the protector can be attached to the regulator without removing the gauge.

The protector may cover the gauge entirely, and the cover portion may include a window, such as a sight glass, for viewing the gauge face.

In another aspect of the invention, the gauge stem and body may be entirely shielded by the gauge protector. If desired, sealing materials may be employed between the base and cover portions and between the base portion and the surface to which the gauge is connected, such that the gauge is enclosed within a watertight cavity. In this manner, the gauge is protected from harm, such as corrosion, caused by contact with fluids as well as harm caused by impact.

In another aspect of the invention, the gauge protector may be attached to the regulator by the same threaded opening that is used to attach the gauge. This way, the protector may be used without any alteration of the regulator body.

An object of the invention is to provide a device or assembly for shielding gauges and other devices, and for protecting such devices from impact and other harms.

Another object of the invention is to provide a gauge protector that can transmit impact forces to a wall to which the gauge protector is attached.

Another object of the invention is to provide a gauge protector that is economical and easy to install.

Another object of the invention is to provide a gauge protector that can completely enclose a gauge and still allow the face of the gauge to remain visible.

Another object of the invention is to provide a gauge protector that is watertight.

Another object of the invention is to provide a gauge protector that can be installed after the gauge has been installed, and that can be removed without removing the gauge.

Another object of the invention is to provide a gauge protector that can be attached to the surface of an object solely by an opening provided in the surface for attaching the gauge.

Another object of the invention is to provide a method of protecting a gauge or other instrument or the like.

These and other objects and advantages of the invention may best be understood with reference to the following detailed description of preferred embodiments of the invention, the appended claims and the several drawings attached hereto.

DETAILED DESCRIPTION OF PREFERRED EMBODIMENTS

Figure 1:
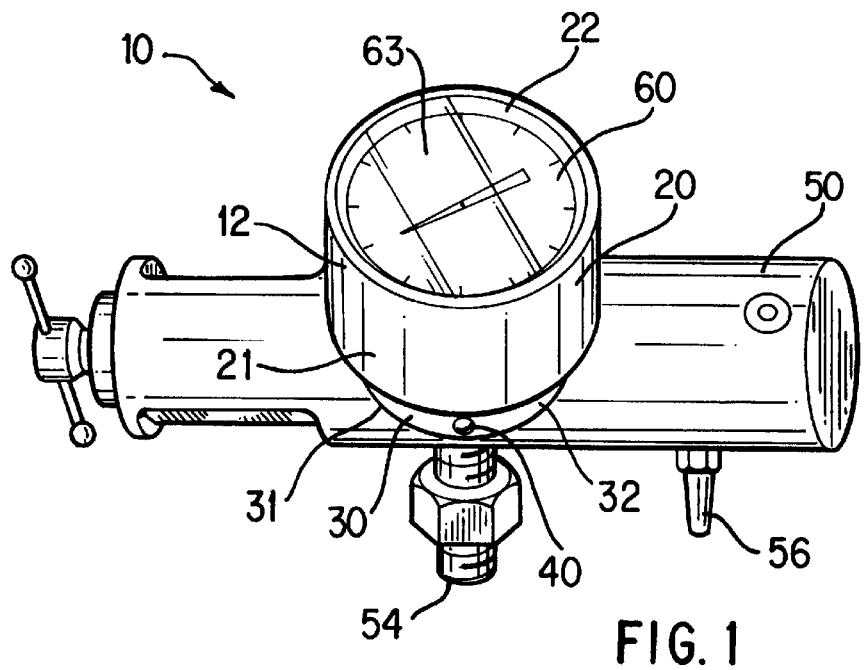
FIG. 1 is a perspective view of a regulator assembly with a protruding gauge and a gauge protector constructed in accordance with one embodiment of the present invention.

Referring now to the drawings, there is shown in FIG. 1 a regulator assembly 10 with a gauge 60 and a gauge protector 12. The protector 12 is arranged to divert impact forces to the surface 50 of the regulator assembly 10, to thereby protect the gauge 60. The protector 12 may also be used to protect the gauge 60 from being contacted by fluids.

The illustrated gauge protector 12 has a cover portion 20 and a base portion 30. The cover and base portions 20, 30 may be formed of aluminum or another suitable material. The material of the protector 12 should be sufficiently rigid to transfer impact forces from the cover portion 20, through the base portion 30, and to the regulator assembly 10, without damaging the gauge 60. The cover portion 20 has a cylindrical main portion 21 and a disc-shaped transparent sight glass 22. The window 22 may be formed of plexiglass or another suitable, transparent and non-breakable material. The face 63 of the gauge 60 is visible through the sight glass 22.

Figure 2:
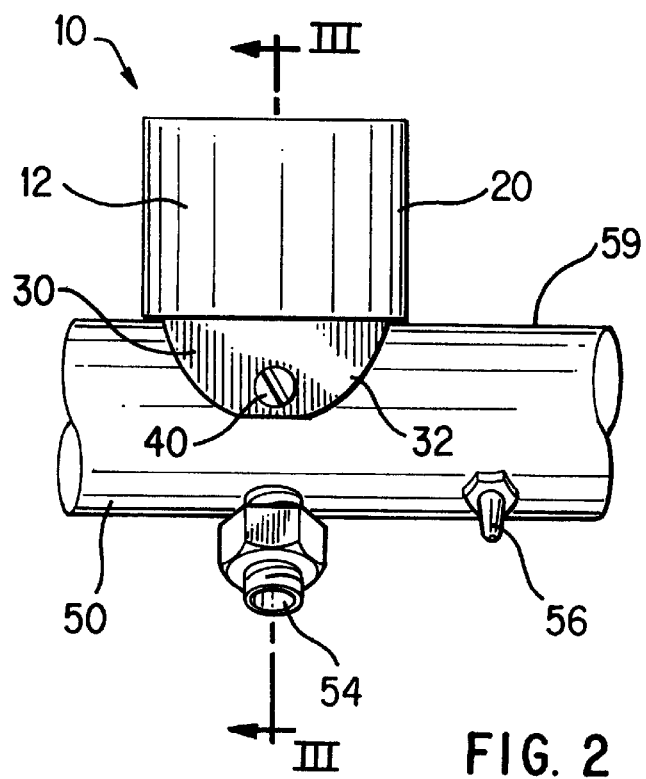
FIG. 2 is a partial side view of the regulator assembly and gauge protector of FIG. 1.
Figure 3:
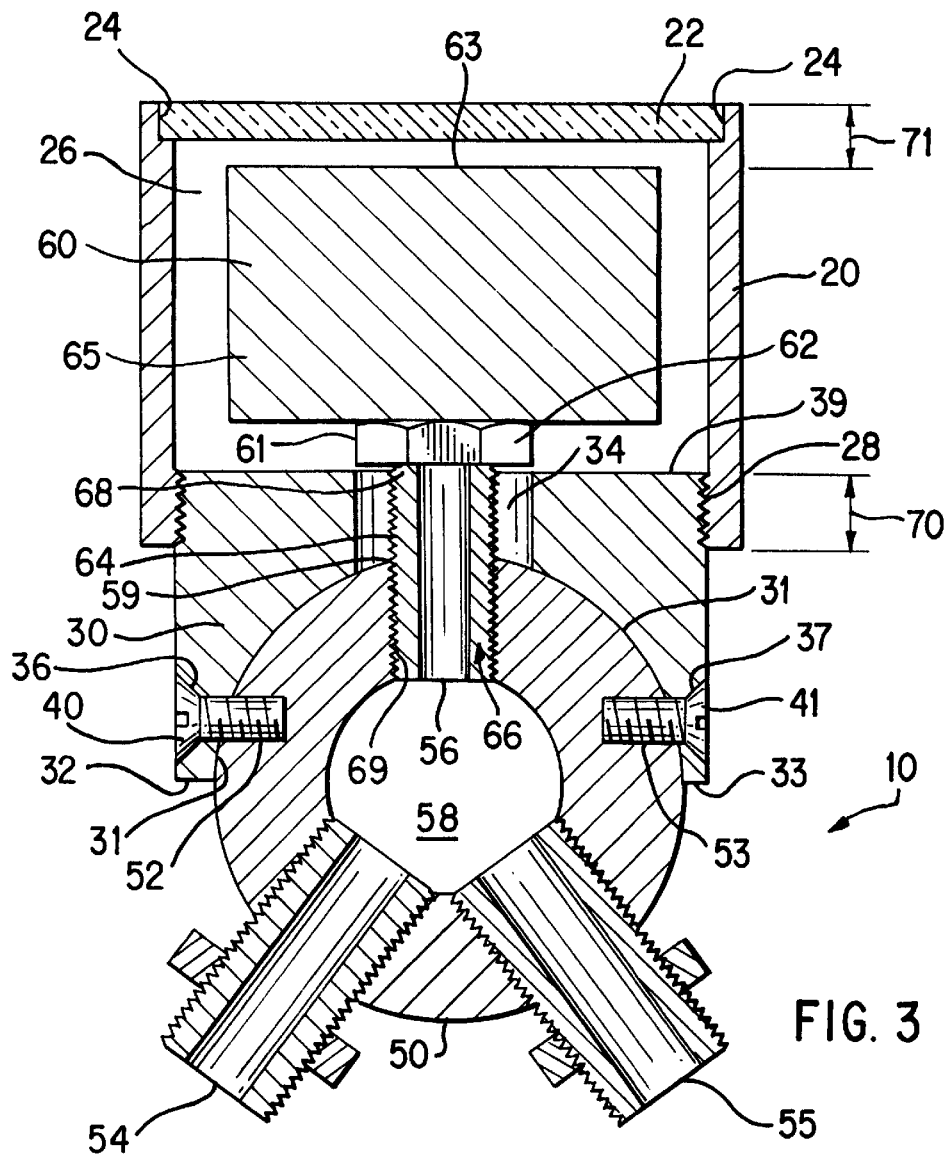
FIG. 3 is a cross sectional view of the regulator assembly and gauge protector of FIG. 1, taken along the line III—III of FIG. 2.

Referring now to FIG. 3, the regulator assembly 10 has first and second outlet ports 54, 55 aligned in the same plane as the gauge 60. A third outlet port 56 (FIG. 2) is located at another portion of the regulator body 50.

The base portion 30 has first and second legs 32, 33 (FIG. 3) defining a saddle-shaped lower surface 31. The lower surface 31 is formed to closely fit the cylindrical surface 50 of the regulator assembly 10. Bolts 40, 41 extend through corresponding counter-sunk holes 36, 37 in the legs 32, 33. The bolts 40, 41 are threaded into openings 52, 53 to attach the base portion 30 to the regulator assembly 10.

The base portion 30 extends only a short distance 70 above the top surface 59 of the cylindrical regulator assembly 10. The short distance 70 permits the use of a short threaded stem 66 to tap into the regulator body 10, 50. The short distance 70 also reduces the torque that can be transmitted from the cover portion 20 to the regulator assembly 10 through the base portion 30 when an impact force is applied to the cover portion 20. In addition, the cover portion 20 extends only a short distance 71 above the top 63 of the gauge 60. This low profile construction reduces the possibility of the protector 12 being struck by another object.

An advantage of the illustrated arrangement is that the saddle-shaped surface 31 of the base portion 30 extends only part way around the cylindrical surface 50 of the regulator assembly 10. This arrangement allows more than half of the cylindrical surface 50 to remain exposed, providing surface area for the two outlet ports 54, 55 to be attached to the cylindrical surface 50 within the same plane of the gauge 60.

The base portion 30 includes a gauge aperture 34 for accommodating the gauge stem 66. The gauge aperture 34 is aligned with a threaded gauge stem opening 56 through the regulator body 50. The lower end 69 of the gauge stem 66 is threaded into the stem opening 56. The other end 68 of the gauge stem 66 is provided with turning surfaces 61, 62 engageable by a wrench to screw the stem 66 into the opening 56.

The turning surfaces 61, 62 remain above the flat upper surface 39 of the base portion 30 even when the gauge 60 is fully screwed into the cylindrical regulator body 50. Thus, the turning surfaces 61, 62 may be engaged by a wrench (not shown) to remove the gauge 60. The gauge stem 66 is hollow such that fluid communication between the tubular body cavity 58 and the gauge 60 (through the gauge stem 66) is established.

The base portion 30 has an outer threaded surface 38 (FIG. 4) for receiving an inner threaded surface 28 (FIG. 3) of the cover portion 20. In this manner, the cover portion 20 may be removed by unscrewing it to gain access to the gauge 60.

The cover portion 20 includes a sight glass recess 24 for accepting and securing the sight glass 22 to the cover portion 20. The gauge cavity 26 is sized such that the cylindrical gauge body 65 is fully enclosed by the cover portion 20, the sight glass 22, and the flat upper surface 39 of the base portion 30. This arrangement protects the gauge 60 from being impacted by all objects, even small and sharp objects.

Figure 4:
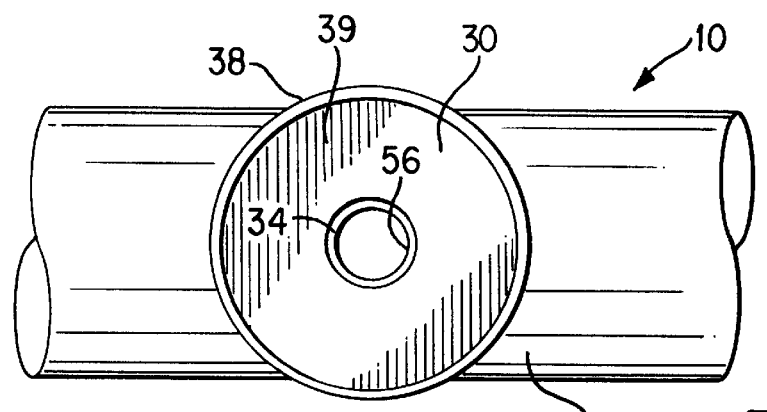
FIG. 4 is a partial top view of the regulator assembly and gauge protector of FIG. 1, with the gauge and the cover portion of the gauge protector removed.

Referring now to FIG. 4, the diameter of the gauge aperture 34 is greater than the diameter of the threaded opening 56 to allow the gauge stem 66 to pass through the base portion 30 into the wall 50 of the regulator assembly 10.

Sealing means, such as O-rings, washers, or joint compound, may be provided for each of the joints between the various surfaces of the gauge protector 12 and the joint between the gauge protector 12 and the cylindrical surface of the regulator assembly 10. The sealing means may be used to form a watertight gauge cavity 26.

Figure 5:
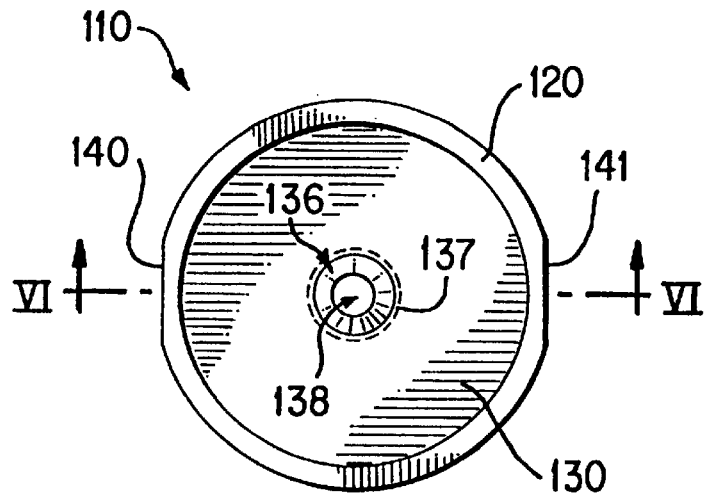
FIG. 5 is a top view of another gauge protector constructed in accordance with the present invention.

Another gauge protector 110 constructed in accordance with the present invention is shown in FIG. 5. The protector 110 has flat turning surfaces 140, 141 to be engaged by a wrench (not shown) for screwing the gauge protector 110 into the threaded opening 56 in the regulator assembly 10 (not shown in FIG. 5).

Figure 6:
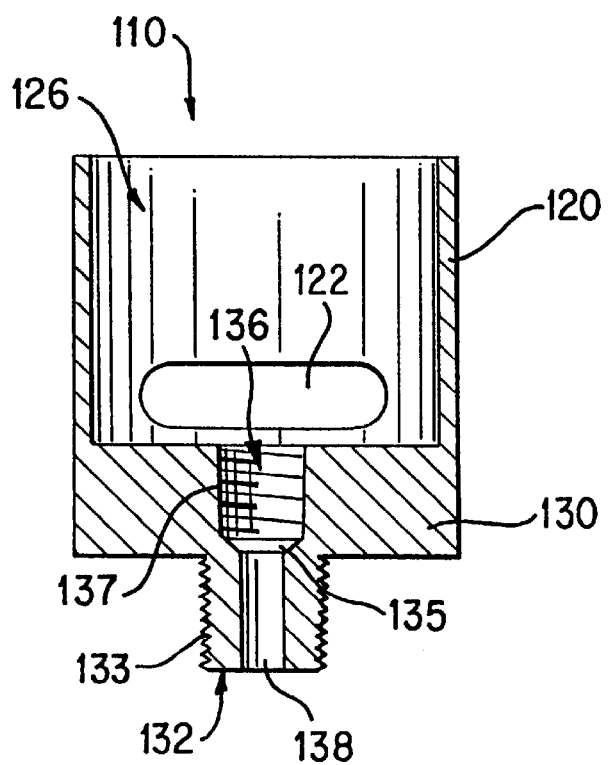
FIG. 6 is a cross sectional view of the gauge protector of FIG. 5, taken along the line VI—VI.

The gauge protector 110 includes a cover portion 120 (FIG. 6) and an integral base portion 130. The base portion 130 has a base stem 132 with threads 133 adapted to fit the threads in the opening 56. The base stem 132 includes a center bore 138. The base portion 130 also includes a gauge stem opening 136 with a beveled surface 135 on top of and centered over the center bore 138. The two openings 136, 138 may be axially aligned. The walls of the opening 136 are threaded 137 to engage the threaded stem 66 of the gauge 60 (not shown in FIGS. 5 and 6).

The cover portion 120 forms a gauge cavity 126 large enough to allow the gauge 60 to be placed into the protector 120 through the open top of the cover portion 120. A wrench aperture 122 is defined in the cover portion 120 to allow engagement of the turning surfaces 61, 62 of the gauge 60 inside the cavity 126 by a wrench from outside the cavity 126.

In an alternative embodiment of the invention, the protector 110 may be formed of separate pieces with threaded surfaces for attaching the cover portion 120 to the base portion 130 in a manner similar to that shown in FIG. 3. Such a threaded arrangement would make it possible to completely cover the gauge 60 while retaining the ability to remove the gauge 60 without removing the gauge protector 110. With the threaded arrangement (not illustrated in FIGS. 5 and 6) the cover portion 120 could be removed to allow access to the turning surfaces 61, 62 of the gauge 60.

Figure 7:
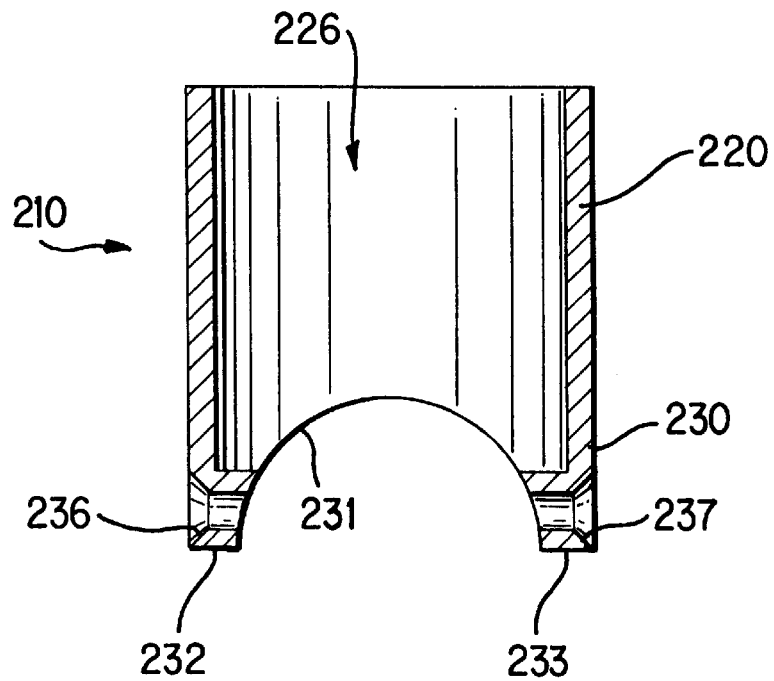
FIG. 7 is a cross sectional view of a third gauge protector constructed in accordance with the present invention.

A single-piece gauge protector 210 is depicted in FIG. 7. The gauge protector 210 includes a cover portion 220 and an integral base portion 230. The base portion 230 includes a saddle-shaped lower surface 231 formed by two legs 232, 233. Two counter-sunk holes 236, 237, one through each of the legs 232, 233, are provided for accepting two bolts 40, 41 for attaching the base portion 230 to a cylindrical surface 50. The cover portion 220 forms a gauge cavity 226 to accept a gauge 60. An opening is provided through the center of the base portion 230 to receive a gauge stem 66 through the base portion 230 to the cylindrical surface 50 of the regulator assembly 10.

Figure 8:
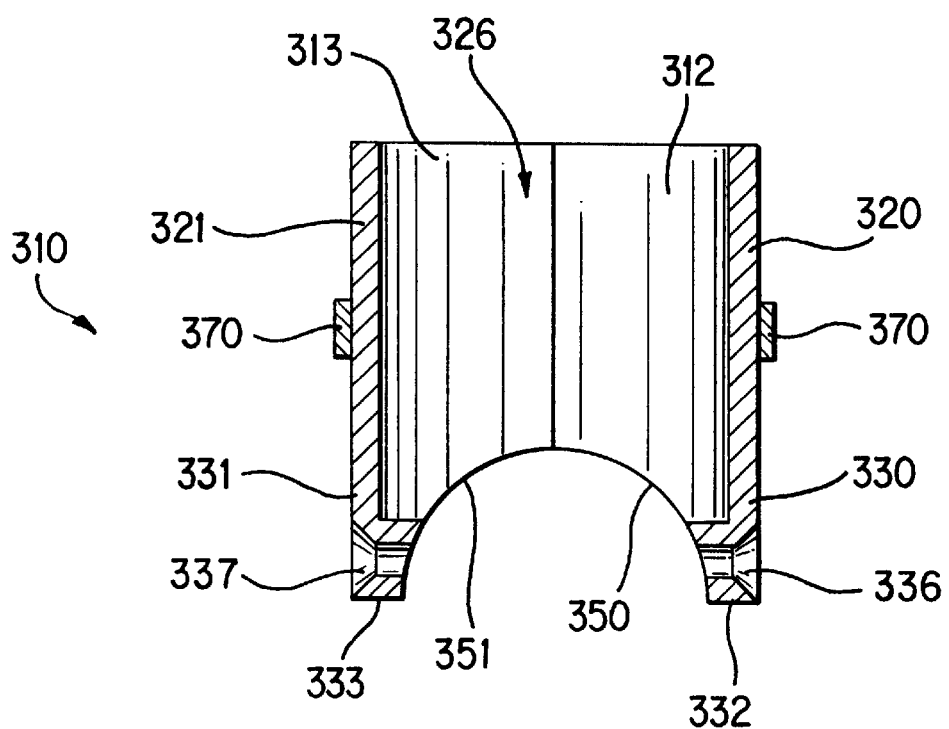
FIG. 8 is a cross sectional view of a fourth gauge protector constructed in accordance with the present invention.

Another gauge protector 310 is depicted in FIG. 8. The gauge protector 310 includes two pieces 312, 313 separated along a plane passing through the center of the protector 310 and the longitudinal axis of the regulator assembly 10.

Each half of the gauge protector 310 has a cover portion 320, 321 and an integral base portion 330, 331. The base portions 330, 331 include saddle-shaped lower surfaces 350, 351 formed by a leg 332, 333 on each of the base portions 330, 331. Two counter-sunk holes 336, 337, one through each of the legs 332, 333, are provided for accepting bolts 40, 41. The bolts 40, 41 attach the base portions 330, 331 to the cylindrical surface 50. The cover portions 320, 321 form a gauge cavity 326 to accept the gauge 60.

A band 370 may be used to encircle the sections 312, 313 of the gauge protector 310 to help keep the two sections 312, 313 together. Alternatively, the sections 312, 313 may be snap-fitted together.

The arrangement illustrated in FIG. 8 allows the protector 310 to be installed after the gauge 60 has been installed, which is convenient for at least two reasons. First, it allows the gauge protector 310 to be retro-fitted to a regulator assembly 10 without removing the gauge 60 to be protected. Second, it allows the gauge protector 310 to be removed so that the surface-gauge joint may be inspected for leaks.

Figure 9:
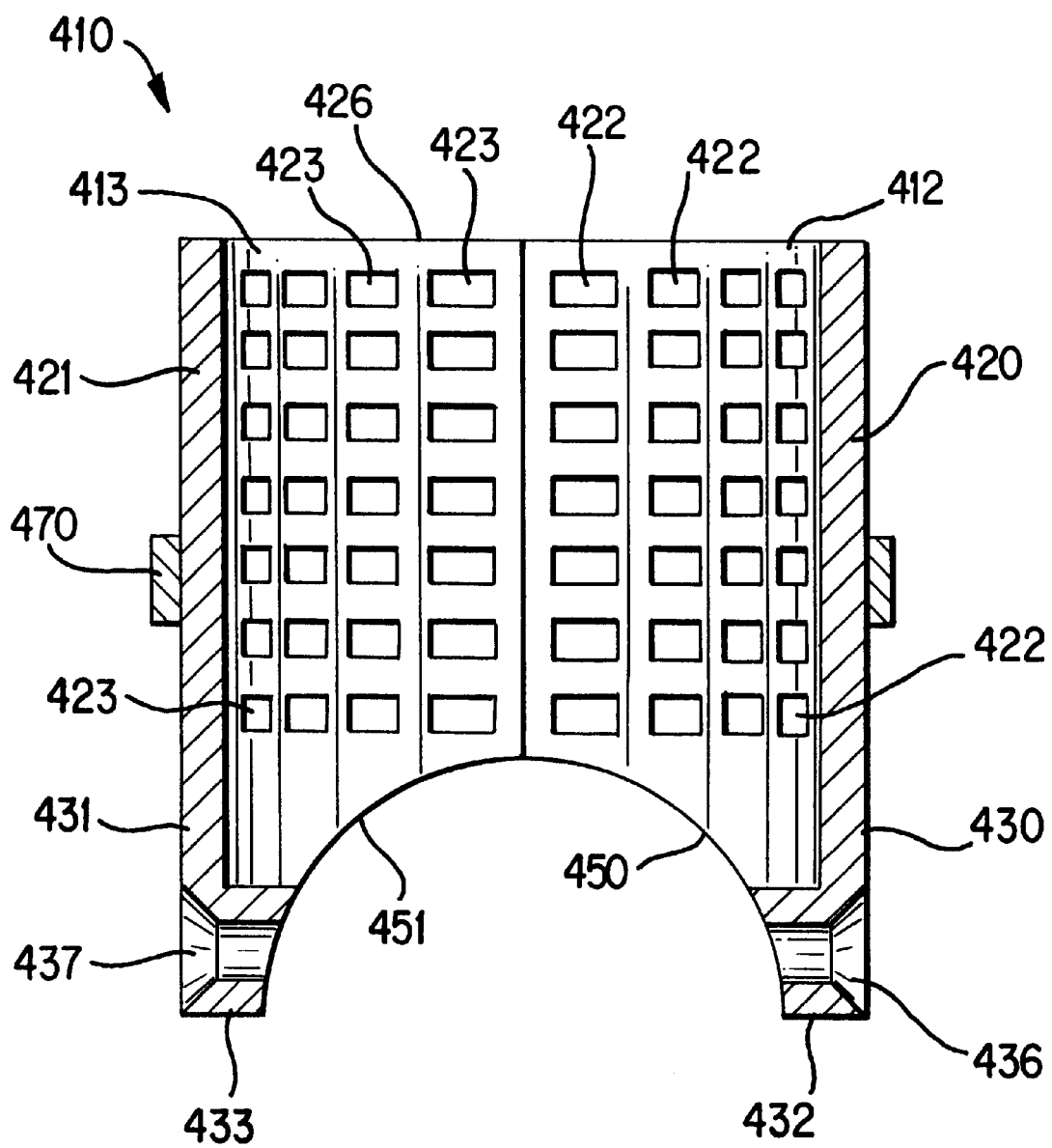
FIG. 9 is a cross sectional view of a fifth gauge protector constructed in accordance with the present invention.

Another gauge protector 410 is depicted in FIG. 9. The only difference between the gauge protector 410 of FIG. 9 and the gauge protector 310 of FIG. 8 is that a number of apertures 422, 423 are provided to form a cage-like cover structure 420, 421. The cage-like structure 420, 421 offers substantial protection from objects larger than the cage openings 422, 423 and reduces the overall weight of the protector 420.

The above description and drawings are only illustrative of preferred embodiments which achieve various objects, features, and advantages of the invention. It is not intended that the invention be limited thereto. It will be obvious to those skilled in the art that a number of modifications may be made without departing from the scope and spirit of the invention. Any modification of the invention which comes within the spirit and scope of the following claims is considered part of the invention.

What is claimed is:

1. A regulator and gauge system, comprising:

a pressure regulator having a body;

a pressure gauge attached to said regulator body; and a gauge protector enclosing said gauge, said gauge protector including a base portion and a removable cover portion, said base portion being attached to said regulator body, said cover portion being releasably connected to said base portion.

2. The system of claim 1, wherein said gauge includes a cylindrical gauge body and a gauge face, said gauge body being located within said protector, and wherein said protector includes a window for viewing said gauge face.

3. The system of claim 1, wherein said regulator is adapted to be connected to an oxygen bottle.

4. A regulator and gauge system, comprising:

a pressure regulator having a body;

a pressure gauge attached to said regulator body; and a gauge protector enclosing said gauge, said gauge protector including a base portion, said base portion having a stem, said stem being attached to said regulator body; and wherein said gauge includes a hollow threaded stem providing fluid communication between said gauge and said pressure regulator, said hollow threaded stem of said gauge being located in said stem of said gauge protector base portion.

5. The system of claim 4, further comprising flat surfaces for engaging a wrench for assembling said system.

6. The system of claim 5, wherein said pressure regulator has a cylindrical surface.

7. A regulator and gauge system, comprising:

a pressure regulator having a body, said regulator body having a cylindrical exterior surface;

a pressure gauge attached to said regulator body; and a gauge protector enclosing said gauge, said gauge protector including a base portion, said base portion being attached to said regulator body; and wherein said base portion of said gauge protector has legs forming a saddle-shaped surface closely fitting the cylindrical exterior surface of said regulator body.

8. The system of claim 7, wherein said legs of said protector base portion are connected to said pressure regulator by threaded bolts.

* * * * *

UNITED STATES PATENT AND TRADEMARK OFFICE
CERTIFICATE OF CORRECTION

PATENT NO.   : 6,085,597

DATED        : July 11, 2000

INVENTOR(S)  : Jeffrey A. Miller, et al.

It is certified that error appears in the above-identified patent and that said Letters Patent is hereby corrected as shown below:

Title page:

Section [75], fourth inventor's name reads "Kin Edward Golemb", should read --Kim Edward Golemb--.

Signed and Sealed this

Twenty-second Day of May, 2001

*Attest:*

NICHOLAS P. GODICI

*Attesting Officer*      *Acting Director of the United States Patent and Trademark Office*